(12) United States Patent
Fu et al.

(10) Patent No.: US 11,236,466 B2
(45) Date of Patent: Feb. 1, 2022

(54) FABRIC PRINT MEDIA

(71) Applicant: Hewlett-Packard Development Company, L.P., Spring, TX (US)

(72) Inventors: Xulong Fu, San Diego, CA (US); Xiaoqi Zhou, San Diego, CA (US); Fredrick Muya Makau, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/268,099

(22) PCT Filed: Dec. 18, 2018

(86) PCT No.: PCT/US2018/066122
§ 371 (c)(1),
(2) Date: Feb. 12, 2021

(87) PCT Pub. No.: WO2020/131021
PCT Pub. Date: Jun. 25, 2020

(65) Prior Publication Data
US 2021/0324578 A1 Oct. 21, 2021

(51) Int. Cl.
*D06P 5/00* (2006.01)
*D06P 1/673* (2006.01)
(Continued)

(52) U.S. Cl.
CPC ............ *D06P 5/002* (2013.01); *B41M 5/506* (2013.01); *B41M 5/508* (2013.01);
(Continued)

(58) Field of Classification Search
CPC ...... D06P 5/002; D06P 1/67341; D06P 5/001; B41M 5/506; B41M 5/508; B41M 5/5218;
(Continued)

(56) References Cited

U.S. PATENT DOCUMENTS

| | | |
|---|---|---|
| 4,296,162 A | 10/1981 | Jean |
| 5,612,168 A | 3/1997 | Ishikawa |

(Continued)

FOREIGN PATENT DOCUMENTS

| | | |
|---|---|---|
| DE | 102011114974 | 4/2013 |
| GB | 2452012 | 2/2009 |
| WO | 2017064260 | 4/2017 |

*Primary Examiner* — Betelhem Shewareged
(74) *Attorney, Agent, or Firm* — Thorpe North & Western LLP

(57) ABSTRACT

A fabric print medium can include a woven fabric substrate, a first barrier layer on an imaging side of the woven fabric substrate where the first barrier layer includes first barrier layer binder and first barrier layer flame retardant, a primer layer on the first barrier layer wherein the primer layer includes primer layer binder and primer layer pigment filler, an imaging layer on the primer layer where the imaging layer includes imaging layer film-forming binder and where the first barrier layer, the primer layer, and the imaging layer have a combined thickness from 10 μm to 70 μm, and a non-woven support layer on a back side of the woven fabric substrate.

15 Claims, 3 Drawing Sheets

(51) Int. Cl.
  *D06N 3/18* (2006.01)
  *B41M 5/50* (2006.01)
  *B41M 5/52* (2006.01)
  *D06N 3/00* (2006.01)

(52) U.S. Cl.
  CPC ........ *B41M 5/5218* (2013.01); *B41M 5/5227* (2013.01); *B41M 5/5281* (2013.01); *D06N 3/0059* (2013.01); *D06N 3/183* (2013.01); *D06P 1/67341* (2013.01); *D06P 5/001* (2013.01)

(58) Field of Classification Search
  CPC . B41M 5/5227; B41M 5/5281; D06N 3/0059; D06N 3/183
  USPC ...................................................... 428/32.16
  See application file for complete search history.

(56) References Cited

U.S. PATENT DOCUMENTS

| | | | |
|---|---|---|---|
| 5,632,844 A | 5/1997 | Pate et al. | |
| 2004/0059038 A1 | 3/2004 | Williams | |
| 2007/0275617 A1 | 11/2007 | Harris et al. | |
| 2007/0286982 A1 | 12/2007 | Higgins et al. | |
| 2011/0008542 A1* | 1/2011 | Zeng | B41M 5/502 427/288 |
| 2015/0152592 A1* | 6/2015 | Fu | D06B 21/00 428/196 |

* cited by examiner

400 applying an ink composition to a fabric print medium to generate a printed image thereon, the fabric print medium, including a woven fabric substrate, a first barrier layer on an imaging side of the woven fabric substrate, the first barrier layer including first barrier layer binder and first barrier layer flame retardant, a primer layer on the first barrier layer, the primer layer including primer layer binder and primer layer pigment filler, an imaging layer on the primer layer, the imaging layer including imaging layer film-forming binder, wherein the first barrier layer, the primer layer, and the imaging layer have a combined thickness from 10 µm to 70 µm, and a non-woven support layer on a back side of the woven fabric substrate — 410

FIG. 4

FABRIC PRINT MEDIA

BACKGROUND

Textile printing has various applications including the creation of signs, banners, artwork, apparel, wall coverings, window coverings, upholstery, pillows, blankets, flags, tote bags, etc. It is an evolving area and is becoming a trend in the visual communication market. As the area of textile printing continues to grow, the demand for new fabric print media increases.

BRIEF DESCRIPTION OF THE DRAWINGS

FIG. 4 is a diagram of an example printing method in accordance with the present disclosure.

DETAILED DESCRIPTION

Figure 1:
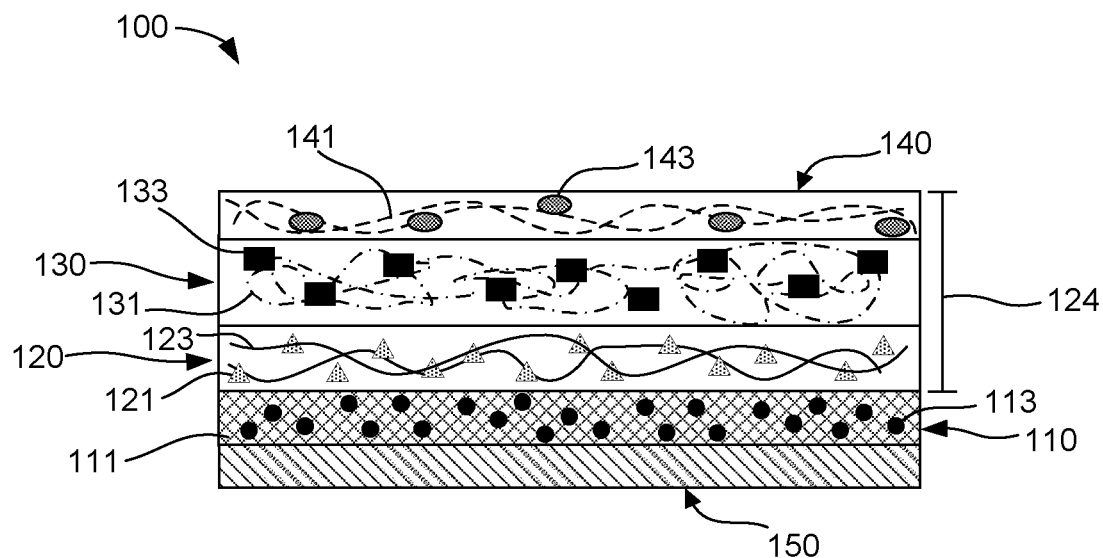
FIG. 1 schematically depicts a cross-sectional view of an example fabric print medium in accordance with the present disclosure.

Textile printing has various applications and can provide the print media with various natural fabric textures. However, the nature of fabric materials can present a number of issues for various printing technologies. For example, some fabrics can be highly absorptive, which can diminish color characteristics. Another issue that can be associated with printing on fabric is a reduction in image durability where printed inks have poor interaction with a rough, and sometimes open, fabric surface. Customers are usually drawn to softer fabric properties while maintaining colorant adherence and image quality. Further, when fabric is intended to be a wallcovering, there are also concerns about the increase of the flammability of the fabric, thus, fire retardant characteristics are often required when providing printable fabrics. Where the fabric print media is a wallcovering fabric, it is also very desirable to have easy installation. Easy installation often means that customers can either directly apply adhesive on the wall or apply the adhesive to the back of the wallcovering. However, some fabrics can have a very rough surface, requiring high amounts of adhesive to provide good adhesion to a wall surface. Obtaining good print characteristics, while retaining fabric texture, easy installation, and fire-retardant characteristics can be challenging.

In accordance with the present disclosure, a fabric print medium includes a woven fabric substrate, a first barrier layer on an imaging side of the woven fabric substrate where the first barrier layer includes first barrier layer binder and first barrier layer flame retardant. A primer layer is on the first barrier layer wherein the primer layer includes primer layer binder and primer layer pigment filler. An imaging layer is on the primer layer where the imaging layer includes imaging layer film-forming binder and where the first barrier layer, the primer layer, and the imaging layer have a combined thickness from 10 μm to 70 μm. A non-woven support layer is on a back side of the woven fabric substrate. In one example of the fabric print medium, the woven fabric substrate has a weight basis from 50 gsm to 400 gsm. In another example of the fabric print medium, the first barrier binder includes a blend of an adhesion promotion polymer binder and a physical networking polymer. In an additional example of the fabric print medium, the imaging film-forming polymer includes a network of multiple polymers including both crosslinked and crosslinkable polymeric binders. In still another example of the fabric print medium, the imaging layer further includes an imaging layer pigment filler. In yet another example of a fabric print medium, the fabric print medium further includes an adhesive layer between the woven fabric substrate and the non-woven fabric support layer, the adhesive layer including an adhesive layer flame retardant. In an additional example of a fabric print medium, the fabric print medium further includes a second barrier layer positioned between the woven fabric substrate and the adhesive layer, the second barrier layer including second barrier layer binder and second barrier layer flame retardant. In yet an additional example of a fabric print medium, the non-woven support layer has a weight basis from 30 grams per square meter (gsm) to 200 gsm. It is further noted that, when referencing gsm throughout the present application, this refers to coating weights on a dry weight basis.

In another example, a method of manufacturing a fabric print medium includes applying a first barrier layer to an imaging side of a woven fabric substrate at a dry weight basis from 0.5 gsm to 10 gsm where the first barrier layer includes a first barrier layer binder and a first barrier layer flame retardant. The method further include applying a primer layer to the first barrier layer at a dry weight basis from 5 gsm to 30 gsm where the primer layer includes primer layer binder and primer layer pigment filler, as well as applying an imaging layer to the primer layer at a dry weight basis from 5 gsm to 20 gsm where the imaging layer includes imaging layer film-forming binder, and applying a non-woven support layer to a back side of the woven fabric substrate. In one example of the method of manufacturing the fabric print medium, the method further includes treating the woven fabric substrate with a flame retardant. In another example of the method of manufacturing the fabric print medium, the method further includes applying a second barrier layer between the woven fabric substrate and the non-woven support layer at a dry weight basis from 0.5 gsm to 10 gsm where the second barrier layer includes a second barrier layer binder and a second barrier layer filler. In still another example of the method of manufacturing the fabric print medium, the method further includes applying an adhesive layer between the second barrier layer and the non-woven support layer at a dry weight basis from 3 gsm to 30 gsm where the adhesive layer includes an adhesive layer flame retardant.

In another example, a printing method includes applying an ink composition to a fabric print medium to generate a printed image thereon. The fabric print medium includes a woven fabric substrate, a first barrier layer on an imaging side of the woven fabric substrate where the first barrier layer includes first barrier layer binder and first barrier layer flame retardant. In further detail, a primer layer is on the first barrier layer where the primer layer includes primer layer binder and primer layer pigment filler, and furthermore, an imaging layer on the primer layer where the imaging layer includes imaging layer film-forming binder. The first barrier layer, the primer layer, and the imaging layer have a combined thickness from 10 μm to 70 μm. A non-woven support layer is on a back side of the woven fabric substrate. In one example of the printing method, the method further includes curing the fabric print medium with the ink composition applied thereto at a temperature of from 75° C. and 150° C. to cause the imaging layer film-forming binder to form a film. In another example of the printing method, the ink composition is a latex-based ink composition with pigment colorant.

In addition to the examples described above, the fabric print media, methods of manufacturing, and printing methods will be described in greater detail below. It is also noted that when discussing the fabric print media and methods described herein, these relative discussions can be considered applicable to the other examples, whether or not they are explicitly discussed in the context of that example. Thus, for example, in discussing an adhesive layer related to a fabric print medium, such disclosure is also relevant to and directly supported in the context of the methods described herein, and vice versa.

FIG. 1 illustrates one example of a fabric print medium 100. In this particular example, the fabric print medium includes a woven fabric substrate 110 including a woven fabric material 111. A first barrier layer 120 is positioned on an imaging side of the woven fabric substrate. The first barrier layer includes a first barrier layer flame retardant 121 and a first barrier layer binder 123. A primer layer 130 is formed on the first barrier layer. The primer layer includes a primer layer binder 131 and a primer layer pigment filler 133. An imaging layer 140 is formed on the primer layer. The imaging layer can include an imaging layer film-forming binder 141. The first barrier layer, the primer layer, and the imaging layer can have a combined thickness 124 from 10 µm to 70 µm. A non-woven support layer 150 is positioned on a backside of the woven fabric substrate opposite the imaging side.

Figure 2:
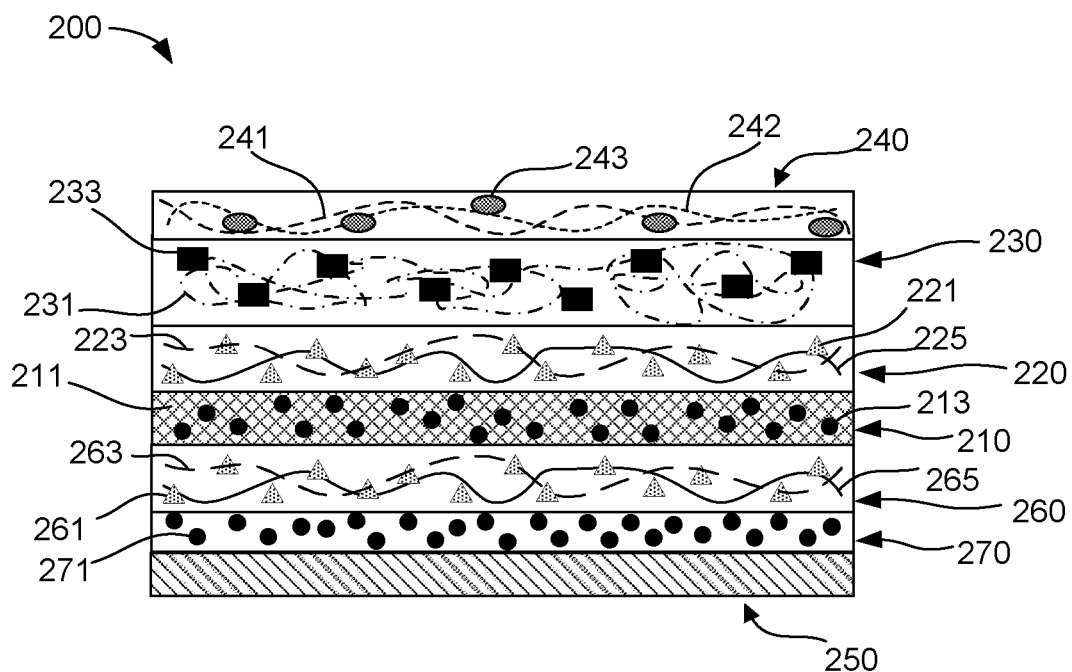
FIG. 2 schematically depicts a cross-sectional view of another example fabric print medium in accordance with the present disclosure.

FIG. 2 illustrates another example of a fabric print medium 200. In this particular example, the fabric print medium includes a woven fabric substrate 210 including a woven fabric material 211 treated with a flame retardant 213. The flame retardant can likewise be used to treat the woven fabric material shown and described with respect to FIG. 1. A first barrier layer 220 is positioned on an imaging side of the woven fabric substrate. The first barrier layer includes a first barrier layer flame retardant 221, a first barrier layer adhesion promotion polymer binder 223, and a first barrier layer physical networking polymer 225. A primer layer 230 is formed on the first barrier layer. The primer layer includes a primer layer binder 231 and a primer layer pigment filler 233. An imaging layer 240 is formed on the primer layer. The imaging layer can include a first imaging layer film-forming binder 241, a second imaging layer film-forming binder 242, and an imaging layer pigment filler 243. The imaging layer pigment filler can likewise be used in the imaging layer shown and described in FIG. 1. A second barrier layer 260 is positioned on a backside of the woven fabric substrate opposite the imaging side. The second barrier layer includes a second barrier layer flame retardant 261, a second barrier layer adhesion promotion polymer binder 263, and a second barrier layer physical networking polymer 265. The second barrier layer can generally include the same types of components and parameters as described with respect to the first barrier layer. In some examples, the first barrier layer and the second barrier layer can be compositionally equivalent. In other examples, the first barrier layer and the second barrier layer can be compositionally distinct. An adhesive layer 270 is positioned on the second barrier layer. The adhesive layer includes an adhesive layer flame retardant 271. A non-woven support layer 250 is positioned on the adhesive layer.

In further detail regarding the examples shown in FIGS. 1 and 2, the fabric print media can include a variety of suitable woven fabric substrates. Generally, the fabric substrate can include any woven textile, fabric material, fabric clothing, or other fabric structure. The term "fabric" can be used to mean a textile, a cloth, a fabric material, fabric clothing, or another fabric product. The terms "warp" and "weft" refer to weaving terms that have their ordinary means in the textile arts, as used herein, e.g., warp refers to lengthwise or longitudinal yarns on a loom, while weft refers to crosswise or transverse yarns on a loom.

It is notable that the term "fabric substrate" does not include materials commonly known as any kind of paper (even though paper can include multiple types of natural and synthetic fibers or mixture of both types of fibers). Furthermore, fabric includes both textiles in its filament form, in the form of fabric material, or even in the form of fabric that has been crafted into finished article (clothing, blankets, tablecloths, napkins, bedding material, curtains, carpet, shoes, etc.).

In some specific examples, the woven fabric substrate can include warp yarns and weft yarns that are mutually positioned at an angle of about 90°. In other examples, the warp and weft yarns can be mutually positioned at angles of from 10° to 90°, from 15° to 70°, or about 45°. This woven fabric can include, but is not limited to, fabric with a plain weave structure, fabric with a twill weave structure where the twill weave produces diagonal lines on a face of the fabric, a satin weave, the like, or a combination thereof. In some specific examples, the weave can be a twill weave structure. Generally, twill is a type of textile weave with a pattern of diagonal parallel ribs. In some examples, this can be achieved by passing the weft thread over one or more warp threads then under two or more warp threads and so on, with a "step," or offset, between rows to create the characteristic diagonal pattern.

Regardless of the structure, in one example, the woven fabric substrate can include natural fibers, synthetic fibers, or a combination thereof. Exemplary natural fibers can include, but are not limited to, wool, cotton, silk, linen, jute, flax, hemp, rayon fibers, thermoplastic aliphatic polymeric fibers derived from renewable resources (e.g. cornstarch, tapioca products, sugarcanes), or a combination thereof. In another example, the fabric base substrate can include synthetic fibers. Exemplary synthetic fibers can include polymeric fibers such as, polyvinyl chloride (PVC) fibers, PVC-free fibers made of polyester, polyamide, polyimide, polyacrylic, polypropylene, polyethylene, polyurethane, polystyrene, polyaramid (e.g., Kevlar®) polytetrafluoroethylene (Teflon®) (both trademarks of E. I. du Pont de Nemours Company, Delaware), fiberglass, polytrimethylene, polycarbonate, polyethylene terephthalate, polyester terephthalate, polybutylene terephthalate, or a combination thereof. In some examples, the synthetic fiber can be a modified fiber from the above-listed polymers. The term "modified fiber" refers to one or both of the polymeric fiber and the fabric as a whole having undergone a chemical or physical process such as, but not limited to, one or more of a copolymerization with monomers of other polymers, a chemical grafting reaction to contact a chemical functional group with one or both the polymeric fiber and a surface of the fabric, a plasma treatment, a solvent treatment, acid etching, or a biological treatment, an enzyme treatment, or antimicrobial treatment to prevent biological degradation. The term "PVC-free fibers" as used herein means that no polyvinyl chloride (PVC) polymer or vinyl chloride monomer units are in the fibers.

As previously mentioned, the woven fabric substrate can be a combination of fiber types, e.g. a combination of any natural fiber with another natural fiber, any natural fiber with a synthetic fiber, a synthetic fiber with another synthetic fiber, or mixtures of multiple types of natural fibers and/or synthetic fibers in any of the above combinations. In some examples, the fabric base substrate can include natural fiber and synthetic fiber. The amount of each fiber type can vary. For example, the amount of the natural fiber can vary from 5 wt % to 95 wt % and the amount of synthetic fiber can range from 5 wt % to 95 wt %. In yet another example, the amount of the natural fiber can vary from 10 wt % to 80 wt % and the synthetic fiber can be present from 20 wt % to 90 wt %. In other examples, the amount of the natural fiber can be 10 wt % to 90 wt % and the amount of synthetic fiber can also be 10 wt % to 90 wt %. Likewise the ratio of natural fiber to synthetic fiber in the fabric base substrate can vary. For example, the ratio of natural fiber to synthetic fiber can be 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, or vice versa.

In one example, the woven fabric substrate can have a basis weight ranging from 50 gsm to 400 gsm. In other examples, the woven fabric substrate can have a basis weight ranging from 100 gsm to 300 gsm, from 75 gsm to 250 gsm, from 125 gsm to 300 gsm, or from 150 gsm to 350 gsm.

In addition, the woven fabric substrate can contain additives including, but not limited to, one or more of colorant (e.g., pigments, dyes, and tints), antistatic agents, brightening agents, nucleating agents, antioxidants, UV stabilizers, fillers, and lubricants, for example. Alternatively, the woven fabric substrate may be pre-treated in a solution containing the substances listed above before applying other treatments or coating layers.

In some specific examples, the woven fabric substrate can be treated with a flame retardant to prepare a treated woven fabric substrate. A variety of suitable flame retardants can be employed. Generally, flame retardants refer to a substance that reduces flammability or delays combustion of the fabric print media disclosed herein. In some examples, compounds containing a halogen or antimony are excluded from the list of suitable flame retardants as they are considered as non-environmentally friendly compounds. Non-limiting examples of suitable flame retardants can include phosphorus-containing compounds and nitrogen-containing compounds. Phosphorus-containing compounds including organic phosphates, inorganic phosphates, and/or phosphates with different oxidation states can be effective flame retardants. Nitrogen-containing compounds that can likewise be used include melamine (including melamine derivatives) such as melamine, melamine cyanurate, melamine polyphosphate, melem, and melon. In some examples, the flame retardant can be a phosphorus-containing and a nitrogen-containing flame retardant. The flame retardant can be dissolved or dispersed in a suitable solvent, such as water, organic co-solvent, surfactant, the like, or a combination thereof. Non-limiting examples of commercially available flame retardants that can be used to pretreat the woven fabric substrate can include AFLAMMIT® PE, AFLAMMIT® MSG, and FLAMMENTIN® MSG each commercially available from Thor Specialties, Inc (Connecticut, USA).

The woven fabric substrate can have an imaging side and a back side. The imaging side can be a side of the woven fabric substrate that is intended to receive an ink to form a printed image thereon. A first barrier layer can be formed on the imaging side of the woven fabric substrate. The first barrier layer can also be an adhesion promotion layer. The first barrier layer can generally include a first barrier layer binder. In some specific examples, the first barrier layer binder can include an adhesion promotion polymer binder and a physical networking polymer.

In one example, the adhesion promotion polymer binder can be a water-soluble or water-dispersible polymer and can include acrylic acid, acrylic emulsion, acrylic-polyurethane, acrylic polymer latex, acrylamide, acrylonitrile, butadiene, acrylonitrile-butadiene, acrylonitrile-butadiene latex, casein, cellulose, carboxy-methyl cellulose, dimethylamino-ethyl methacrylate, ethyl acrylate, ethylene, ethylene-vinyl acetate, gelatin, hydroxyethyl acrylate, hydroxyethyl cellulose, hydroxyethyl methacrylate, maleic anhydride, methyl acrylate, methyl methacrylate, methyl vinylether, methyl vinylketone, methacrylamide, polyacrylates, polyacrylic acid, poly(ethylene oxide), polyester, polyester emulsion, polyester resin, polyvinyl acetate, polyvinyl alcohol, cationic polyvinyl alcohol, aceto-acetylated polyvinyl alcohol, silyl-modified polyvinyl alcohol, polyvinyl amine, polyvinyl pyrrolidone, polystyrene, polymethacrylate, polyacrylic ester, polymethacrylic ester, polyurethane, polyurethane resin, polyacrylamide, starch, sodium vinylsulfonate, styrene, styrene-butadiene, styrene-butadiene emulsion, styrene butadiene rubber, soy protein, vinyl acetate, vinyl acetate latex, vinylamide, vinyl caprolactam, vinyl chloride, vinylidene chloride, vinylidene chloride latex, vinylimidazole, vinyl acrylic, vinyl pyrrolidone, vinyl pryridine, vinyl propionate, the like, or a combination thereof.

In another example, the adhesion promotion polymer binder can be a water-soluble polymer, such as polyvinyl alcohol, starch, gelatin, cellulose, polyacrylamide, the like, or a combination thereof. In yet another example, the adhesion promotion polymer binder can be a water-dispersible polymer such as a polymer selected from acrylic polymers or copolymers, vinyl acetate latex, polyesters, vinylidene chloride latex, styrene-butadiene copolymer, acrylonitrile-butadiene copolymer, the like, or combinations thereof. In yet another example, the adhesion promotion polymer binder can be a styrene butadiene copolymer, polyacrylates, polyvinylacetates, polyacrylic acids, polyesters, polyvinyl alcohol, polystyrene, polymethacrylates, polyacrylic esters, polymethacrylic esters, polyurethanes, copolymers thereof, the like, or a combination thereof. In some examples, the adhesion promotion polymer binder can be acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers, the like, or a combination thereof. In a further example, the adhesion promotion polymer binder can include an acrylonitrile-butadiene latex.

In further examples, the adhesion promotion polymer binder can be a latex containing particles of vinyl acetate-based polymer, an acrylic polymer, a styrene polymer, a styrene-butadiene rubber polymer, a polyester polymer, a vinyl chloride polymer, the like, or a combination thereof. In other examples, the adhesion promotion polymer binder can be a polymer or a copolymer of acrylic polymers, vinyl-acrylic copolymers, acrylic-polyurethane copolymers, the like, or a combination thereof. Additional exemplary adhesion promotion polymer binders can include polyvinyl alcohol, vinylpyrrolidone, a copolymer of vinylpyrrolidone copolymerized with monomers, such as methyl acrylates, methyl methacrylate, ethyl acrylate, hydroxyethyl acrylate, hydroxyethyl methacrylate, ethylene, vinylacetates, vinylimidazole, vinylpyridine, vinylcaprolactams, methyl vinylether, maleic anhydride, vinylamides, vinylchloride, vinylidene chloride, dimethylaminoethyl methacrylate, acrylamide, methacrylamide, acrylonitrile, styrene, acrylic acid, sodium vinylsulfonate, vinylpropionate, methyl vinylketone, the like, or a combination thereof. In yet a further example, the adhesion promotion polymer binder can include polyvinyl alcohol, copolymers of polyvinyl alcohol and poly(ethylene oxide), copolymers of polyvinyl alcohol and polyvinylamine, cationic polyvinyl alcohols, acetoacetylated polyvinyl alcohols, polyvinyl acetates, polyvinyl pyrrolidones, copolymers of polyvinyl pyrrolidone and polyvinyl acetate, gelatin, silyl-modified polyvinyl alcohol, styrene-butadiene copolymer, acrylic polymer latex, ethylene-vinyl acetate copolymer, polyurethane resin, polyester resin, the like, or a combination thereof. Exemplary commercially available first barrier layer binders can include Edolan® AB (available from Tanatex® Chemicals, Netherlands), and Poval™ 235, Mowiol® 56-88, and Mowiol® 40-88 (all available from Kuraray® Co. Ltd, Japan).

The adhesion promotion polymer binder can have a weight average molecular weight (Mw) of 5,000 MW to 200,000 MW. In another example, the weight average molecular weight of the adhesion promotion polymer binder can be from 10,000 Mw to 200,000 Mw. In yet another example, the weight average molecular weight of the adhesion promotion polymer binder can be from 20,000 Mw to 100,000 Mw. In a further example, the average molecular weight of the adhesion promotion polymer binder can be from 100,000 Mw to 200,000 Mw.

The physical networking polymer can be a chemical that promotes physical bonding with the adhesion promotion polymer binder to form a gel-like composition. A "gel-like composition" can have a low solids content (e.g. from 0.1 wt % to 35 wt %) and a high viscosity (>15,000 cps) at low shear stress (5 rpm) when measured by a Brookfield viscometer (Brookfield AMETEK, Massachusetts) at 25° C. A gel-like solution can behave like a non-flowable, semi solid gel, but is able to de-bond at higher shear forces, e.g., 100 rpms or greater, to yield a low viscosity fluid, e.g., less than 5,000 cps.

In some examples, the first barrier layer can have thixotropic behavior. As used herein, "thixotropic behavior" refers to fluids that are non-Newtonian fluids, i.e. which can show a shear stress-dependent change in viscosity. The term "non-Newtonian" refers herein to fluid having a viscosity that is dependent on an applied force such as shear or thermal forces. For example, shear thinning fluids decrease in viscosity with increasing rate of shear. The stronger the thixotropic characteristic of the chemical fluid of the water barrier layer when it undergoes shear stress, the lower the viscosity of the chemical fluid. When the shear stress is removed or reduced, the viscosity can be re-built up. Without being limited to any theory, it is believed that such thixotropic behavior reduces the penetration of the composition into the fabric substrate and helps retain the composition at the top surface of the substrate. The fluid becomes thin under shear force when applied by a coating application head (such as a blade coating head). When the fluid is deposited (the nip of the blade and shear force are removed), the viscosity of fluid can be quickly re-built up and the fluid can remain at the top surface of the treated fabric substrate. In some examples, the first barrier layer can be further defined by a thixotropic index thereof. The "thixotropic index," as used herein, can be defined as the ratio of viscosity at a low shear rate (5 RPM) compared to the viscosity at a high shear rate (100 RPM). In some specific examples, the first barrier layer can have a thixotropic index of from 20 to 500.

In one example, the physical networking component can be a copolymer of acrylates, such as a copolymer of methacrylic acid and ethyl acrylate ester, a copolymer having with an acrylate based polyelectrolyte backbone and a weight average molecular weight from 300,000 Mw to 1,000,000 Mw, a copolymer having a polyester backbone and a weight average molecular weight from 300,000 Mw to 1,000,000 Mw, a copolymer having a polyurethane backbone and a weight average molecular weight from 300,000 Mw to 1,000,000 Mw, the like, or a combination thereof. In one example, the physical networking component can include an acrylate copolymer, a polyethylene glycol copolymer, a polyurethane copolymer, an isophorone diisocyanate, the like, or a combination thereof and the physical networking component can have a weight average molecular weight from 300,000 Mw to 1,000,000 Mw.

Exemplary commercially available copolymers of acrylates can include, but are not limited to, Acusol™ 810A, Acusol™ 830, Acusol™ 835, Acusol™ 842, (Rohm and Haas/The Dow Chemical Co., Pennsylvania), Alcogum® L 11, Alcogum® L 12, Alcogum® L 51, Alcogum® L 31, Alcogum® L 52, (AkzoNobel Co., Chicago) and the like. Exemplary copolymers with acrylate-based polyelectrolyte backbone can include acrylic copolymers pendant with hydrophobic groups in addition to acid groups in backbone distributed throughout the polymer chain. Commercially available acrylic copolymer emulsions examples can include Texicryl® 13-317, Texicryl® 13-313, Texicryl® 13-308, and Texicryl® 13-312 (Scott Bader Commonwealth Ltd., United Kingdom).

In one example, the physical networking component can be a copolymer with a polyester backbone having a weight average molecular weight from 300,000 Mw to 1,000,000 Mw. Exemplary copolymers can include polyethylene glycol copolymers, grafted with pendent hydrophobic groups and with polar groups in the backbone distributed throughout the polymeric chain. A commercially available example includes Rheovis® PE (BASF Corp., North America).

In yet another example, the physical networking component can be a polyurethane copolymer having a polyurethane backbone. Exemplary polymers can include polyethylene glycol and isophorone diisocyanate, which can include end-capping with an alkanol, and which can also be distributed throughout the polymer chain. Commercially available examples can include Acusol™ 880 and Acusol™ 882 (Rohm and Haas/The Dow Chemical Co. Pennsylvania).

The first barrier layer binder (e.g. adhesion promotion polymer binder, physical networking polymer, or combination thereof, for example) can typically be present in the first barrier layer in an amount from 15 wt % to 45 wt % on a dry weight basis. In other examples, the first barrier layer binder can be present in the first barrier layer in an amount from 20 wt % to 40 wt % on a dry weight basis. In still other examples, the first barrier layer binder can be present in the first barrier layer in an amount from 25 wt % to 35 wt % on a dry weight basis.

The first barrier layer can also include a first barrier layer flame retardant. In some examples, the first barrier layer flame retardant can also be a particulate filler material. Non-limiting examples of suitable first barrier layer flame retardants can include aluminum, aluminum hydroxide, aluminum silicate, alumina, colloidal alumina, barium sulfate, boehmite, pseudo-boehmite, calcium, calcium carbonate, calcium silicate, calcium sulfate, clay, diatomite, kaolin, lithopene, magnesium, magnesium carbonate, magnesium hydroxide, magnesium silicate, silica, amorphous silica, synthetic amorphous silica, colloidal silica, talc, titanium dioxide, zinc, zinc oxide, zinc sulfide, zinc carbonate, zeolite, the like, or a combination thereof. In some specific examples, the flame retardant can include aluminum, aluminum hydroxide, aluminum silicate, alumina, colloidal alumina, the like, or a combination thereof. In other examples, the flame retardant can include a phosphorus-containing or nitrogen-containing flame retardant as described above with respect to the woven fabric substrate. Any suitable combination of these flame retardant materials can likewise be used. One non-limiting example of a commercially available flame retardant is SpaceRite® S-3 (available from J.M Huber Corporation, USA).

The first barrier layer flame retardant can typically be present in the first barrier layer in an amount from 50 wt % to 85 wt % on a dry weight basis. In other examples, the first barrier layer flame retardant can be present in the first barrier layer in an amount from 60 wt % to 80 wt % on a dry weight basis. In still additional examples, the flame retardant can be present in the first barrier layer in an amount from 65 wt % to 75 wt % on a dry weight basis.

In some examples, the first barrier layer can include a variety of other components. Non-limiting examples can include an additional filler, a surfactant (e.g. TEGO® Wet 510 (available from Evonik, Germany), for example), a defoaming agent (e.g. FOAMASTER® MO 2185 (available from BASF, USA), for example), a dispersant, the like, or a combination thereof. Where present, these components can typically be individually included in the first barrier layer in an amount from 0.1 wt % to 5 wt % on a dry weight basis.

A primer layer can be formed on the first barrier layer. The primer layer can typically include a primer layer binder and a primer layer pigment filler. In further detail, the primer layer binder can generally include water-soluble binders, water-dispersible binders, or a combination thereof. In one example, suitable primer layer binders can include polyvinyl alcohol, styrene-acrylic copolymer, styrene-butadiene emulsion, acrylonitrile-butadiene latex, the like, or combinations. In another example, in addition to the above binders, other aqueous binders can also be added, including: starch including oxidized starch, cationized starch, esterified starch, enzymatically denatured starch, gelatin, casein, soybean protein, cellulose derivatives including carboxyl-methyl cellulose, hydroxyethyl cellulose, acrylic emulsion, vinyl acetate emulsion, vinylidene chloride emulsion, polyester emulsion, polyvinylpyrrolidone, the like, or a combination thereof. One non-limiting example of a commercially available primer layer binder is a styrene-acrylic binder ACRONAL® 866 (available from BASF, U.S.A). The amount of primer layer binder in the primer layer can be from 5 parts to 40 parts, or from 10 parts to 20 parts, per 100 parts of primer layer pigment filler by dry weight.

The primer layer pigment filler can be selected from both inorganic and organic particulates, either in solid powder form or in dispersed slurry form. It is noted that the pigment fillers described herein are distinct from pigment colorants, as typically employed in inks. Examples of such particulates include, but are not limited to, aluminum silicate, kaolin clay, calcium carbonate, silica, alumina, boehmite, mica, talc, the like, or a combination thereof. In some examples, the primer layer pigment filler includes a clay or a clay mixture. In some examples, the primer layer pigment filler includes calcium carbonate or a calcium carbonate mixture. In some examples, calcium carbonate can include ground calcium carbonate (GCC), precipitated calcium carbonate (PCC), modified GCC, modified PCC, the like, or a combination thereof. Moreover, other combinations of any of the inorganic pigments described may be used. In other examples, the primer layer pigment filler can include an organic pigment filler. Non-limiting examples of organic pigment fillers can include polystyrene and copolymers thereof, polymethacrylates and copolymers thereof, polyacrylates and copolymers thereof, polyolefins and copolymers thereof, the like, or a combination thereof. In some specific examples, of organic pigment fillers can include polyethylene, polypropylene, polyamides, copolymers thereof, the like, or a combination thereof. Any suitable combination of primer layer pigment fillers can be used. Non-limiting commercially available examples can include HYDROCARB® 60 and HYDROCARB® 90 (available from Omya, U.S.A). The primer layer pigment filler can be present in the primer layer in an amount of from 65 wt % to 95 wt % on a dry weight basis. In some additional examples, the primer layer pigment filler can be present in the primer layer in an amount from 75 wt % to 90 wt % on a dry weight basis.

In some examples, the primer layer can also include a variety of other additives, such as a thickener (e.g. STEROCOLL® FS NM (available from BASF, U.S.A.), for example), a film-forming agent, a wetting agent (e.g. DYNWET® 800 (available from BYK, U.S.A.), for example), a defoaming agent (e.g. BYK® 024 (available from BYK, U.S.A.), for example), a dispersant, etc. Where present, these additional additives can typically be individually present in an amount from 0.1 wt % to 5 wt % on a dry weight basis.

An imaging layer can be formed on the primer layer. The imaging layer can typically include an imaging layer film-forming binder. In some examples, the imaging layer film-forming polymer can include a network of multiple polymers, which can include crosslinked and crosslinkable polymeric binders.

In further detail, the imaging layer can include non-deformable particles. More specifically, particles can be selected for use that are non-deformable during manufacturing of the coating composition but that can deform or form a film under printing temperature conditions of the printing process. Thus, particles are rigid and can form a porous array, but are also able to coalesce and flow to form a localized film, due at least in part to the rise in temperature during cure processing of printing, provided the temperature of the printing or curing process is above the glass transition temperature (Tg) of the polymer particles. The non-deformable particles can be reactive polymeric particles or non-reactive polymeric particles. "Reactive polymeric particles" include particles that are capable of cross-linking (either via self-crosslinking, e.g., within a single molecule chain, or among multiple molecule chains, such as in the presence of a crosslinking agent) upon exposure of heat during printing. Under such conditions, the reactive polymeric particles may also coalesce so that the reactive polymer particles flow together to form a film due at least in part to chemical bonding generated in the crosslinking reaction. The crosslinking of the reactive polymer particles can form a continuous, substantially non-porous imaging layer that is both heat flowed and cross-linked. Thus, in this example, the non-deformable particles can be reactive with a crosslinkable functional group. Where this is the case, when there is a rise in temperature during printing or curing processes, the crosslinkable functional group can be activated under the heat and initialize the crosslinking reaction. As a result, upon printing, the collapse of the particle and the crosslinking of the crosslinkable functional groups causes the particles to coalesce and embed printed ink pigment particles so that they physically interlock with the printed or otherwise deposited ink. The reactive polymer particles selected are generally not limited, as long as macromolecular chains of the particles are capable of the crosslinking reaction mentioned above. Some specific examples of polymer particles include particles of a polymer having an epoxy functionality on a backbone of the polymer, particles of a polymer having an epoxy functionality on a side chain of the polymer, particles of a polymer having fatty acid groups, particles of a polymer having alkoxy-silane groups, particles of a polymer having acetoacetoxy groups, particles of a polymer having hydroxyl groups, particles of a polymer having amine groups, and particles of a polymer having carboxyl groups.

It is noted that "non-reactive polymer particles" do not initialize a cross-linking reaction. However, upon exposure to the heat during printing, the non-reactive polymeric particles can coalesce, flowing together to form a film due to the rise in temperature above their glass transition temperature (Tg). The coalescing of the non-reactive polymer particles forms a continuous, substantially non-porous protective film that remains uncrosslinked. The non-deformable and non-reactive particles can be selected from polymers formed by polymerization and/or copolymerization of hydrophobic addition monomers. Examples of hydrophobic addition monomers include, but are not limited to, C1-C12 alkyl acrylate and methacrylate monomers (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl acrylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethyl acrylate, hydroxyethyl methacrylate), carboxylic acid containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomers, C1-C12 alkyl acrylamide and methacrylamide monomers (e.g., t-butyl acrylamide, sec-butyl acrylamide, N,N-dimethylacrylamide), and olefin monomers (e.g., polyethylene, polypropylene, and co-polymers). The non-deformable particles can also be selected from polytetrafluoroethylene (PTFE), silica, silicone, paraffin wax, polyethylene wax, carnauba wax, montan wax, and combinations. In some specific examples, the imaging layer can include a wax in an amount from 5 wt % to 15 wt % on a dry basis.

The imaging layer can also include additional film-forming polymers. Additional film-forming polymers can be similar or the same as those described above with respect to the primer layer. Non-limiting examples of such film-forming polymers suitable for use in the imaging layer can include water-dispersible and water-soluble polymeric compounds such as polyvinyl alcohol, starch derivatives, gelatin, cellulose derivatives, acrylamide polymers, acrylic polymers or copolymers, vinyl acetate latex, polyesters, vinylidene chloride latex, styrene-butadiene, acrylonitrile-butadiene copolymers, styrene acrylic copolymers, and copolymers and combinations.

In some specific examples, the imaging layer film-forming binder can include a first crosslinked polymer network, a second crosslinked polymer network, and a polyurethane polymer. The first crosslinked polymeric network and the second crosslinked polymeric network in the imaging layer can be different and independently can include polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, the like, or a combination thereof.

In one example, the first crosslinked polymeric network, the second crosslinked polymeric network, or the combination thereof, can include a polyacrylate or multiple polyacrylates. Exemplary polyacrylates can include polymers made by hydrophobic addition monomers which include, but are not limited to, C1 to C12 alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmthacrylate), carboxylic containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomer, C1-C12 alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido) methylene), or combinations thereof.

In another example, the first crosslinked polymeric network, the second crosslinked polymeric network, or a combination thereof, can include an epoxy or a combination of different epoxies. The epoxy can be an alkyl epoxy resin, an alkyl aromatic epoxy resin, an aromatic epoxy resin, epoxy novolac resins, epoxy resin derivatives, or combinations thereof. In some examples, the epoxy can include an epoxy functional resin having one, two, three, or more pendant epoxy moieties. Commercially available exemplary epoxy functional resins can include Ancarez™ AR555, Ancarez™ AR550 (both available from Air Products and Chemicals Inc., Pennsylvania), Epi-rez® 3510W60, Epi-rez® 3515W6, Epi-rez® 3522W60 (all available from Hexion, Ohio), or combinations thereof. In some examples, the epoxy resin can be an aqueous dispersion of an epoxy resin. Exemplary commercially available aqueous dispersions of epoxy resins can include Araldite® PZ3901, Araldite® PZ3921, Araldite® PZ3961-1, Araldite® PZ323 (commercially available from Huntsman Advanced Materials, North America), Waterpoxy® 1422 (commercially available from BASF Corp., North America), Ancarez™ AR555 1422 (Air Products and Chemicals, Inc., Pennsylvania), or combinations thereof. In yet another example, the epoxy resin can include a polyglycidyl or polyoxirane resin.

In one example, the epoxy resin can be a self-crosslinked epoxy resin such as polyglycidyl resins, polyoxirane resins, or combinations thereof. These resins can be self-crosslinked by a catalytic homopolymerization reaction of the oxirane functional group or by reacting with co-reactants such as, polyfunctional amines, acids, acid anhydrides, phenols, alcohols, and/or thiols. In another example, the epoxy resin can be crosslinked by an epoxy resin hardener. The epoxy resin hardener can be included in solid form, in a water emulsion, and/or in a solvent emulsion. Exemplary epoxy resin hardeners can include liquid aliphatic amine hardeners, cycloaliphatic amine hardeners, amine adducts, amine adducts with alcohols, amine adducts with phenols, amine adducts with alcohols and phenols, amine adducts with emulsifiers, ammine adducts with alcohols and emulsifiers, polyamines, polyfunctional polyamines, acids, acid anhydrides, phenols, alcohols, thiols, or combinations thereof. Exemplary commercially available epoxy resin hardeners can include Anquawhite® 100 (Air Products and Chemicals Inc., Pennsylvania), Aradur® 3985 (Huntsman Advanced Materials, North America), Epikure® 8290-Y-60 (Hexion, Ohio), or combinations thereof.

In another example, the first crosslinked polymeric network, the second crosslinked polymeric network, or a combination thereof, can include an epoxy resin with additional components. For example, the first and/or second crosslinked polymeric network can include a water-based epoxy resin and a water-based polyamine. In another example, the first and/or second crosslinked polymeric network can include a vinyl urethane hybrid polymer, a water-based epoxy resin, and a water-based polyamine epoxy resin hardener. In yet another example, the first and/or second crosslinked polymeric network can include an acrylic-urethane hybrid polymer, a water-based epoxy resin, and a water based polyamine epoxy resin hardener.

In a further example, the first or second crosslinked polymeric network can include a styrene maleic anhydride (SMA). A commercially available example of SMA can include NovaCote® 2000 (Coim, Italy). In yet another example, the styrene maleic anhydride can be combined with an amine terminated polyethylene oxide (PEO), amine terminated polypropylene oxide (PPO), a copolymer thereof, or a combination thereof. In one example, combining a styrene maleic anhydride with an amine terminated PEO and/or PPO can strengthen the polymeric network by crosslinking the acid carboxylate functionalities of the SMA to the amine moieties on the amine terminated PEO and/or PPO. The amine terminated PEO and/or PPO, in one example, can include amine moieties at one or both ends of the PEO and/or PPO chain, and/or as branched side chains on the PEO and/or PPO. Utilizing an amine terminated PEO and/or PPO in combination with a SMA can allow for the user to retain the glossy features of the SMA while eliminating the brittle nature of the SMA. Exemplary commercially available amine terminated PEO and/or PPO compounds can include Jeffamine® XTJ-500, Jeffamine® XTJ-502, and Jeffamine® XTJ D-2000 (all available from Huntsman Advanced Materials, North America). In some examples, a weight ratio of the SMA to the amine terminated PEO and/or PPO can range from 100:1 to 2.5:1. In another example, a weight ratio of the SMA to the amine terminated PEO and/or PPO can range from 90:1 to 10:1 or from 75:1 to 25:1.

In some examples, the first crosslinked polymeric network can be crosslinked to itself, to the second crosslinked polymeric network, or to itself and to the second crosslinked polymeric network. In one example, the second crosslinked polymeric network can be crosslinked to itself, to the first polymeric network, or to itself and the first polymeric network. When the first crosslinked polymeric network and the second crosslinked polymeric network are not crosslinked to one another they can be entangled or can appear layered onto one another.

In some specific examples, the first crosslinked polymeric network can be or include an epoxy resin. In some further examples, the epoxy resin can be based on bisphenol-A, bisphenol-F, tetrabromobisphenol-A, phenol novolacs, cresol novolacs, amino phenol, methylene dianiline, isocyanuric acid, the like, or a combination thereof. In some additional specific examples, the second crosslinked polymeric network can be based on polyamides, aliphatic amines, cycloaliphatic amines, aromatic amines, anhydrides, novolacs, the like, or a combination thereof. The first crosslinked network and the second crosslinked network can typically be present at a weight ratio of from 1:2 to 2:1, from 1:1.5 to 1.5:1, or from 1:1.2 to 1.2:1.

In one example, the polyurethane polymer can be hydrophilic. In another example, the polyurethane can be formed by reacting an isocyanate with a polyol. In one example, a polyurethane prepolymer can be prepared with a NCO/OH ratio from 1.2 to 2.2. In other examples, the polyurethane prepolymer can be prepared with a NCO/OH ratio from 1.4 to 2.0 or from 1.6 to 1.8. Exemplary isocyanates that can be used to create the polyurethane polymer can include toluenediisocyanate, 1,6-hexamethylenediisocyanate, diphenylmethanediisocyanate, 1,3-bis(isocyanatemethyl)cyclohexane, 1,4-cyclohexyldiisocyanate, p-phenylenediisocyanate, 2,2,4(2,4,4)-trimethylhexamethylenediisocyanate, 4,4'-dicychlohexylmethanediisocyanate, 3,3'-dimethyldiphenyl, 4,4'-diisocyanate, m-xylenediisocyanate, tetramethylxylenediisocyanate, 1,5-naphthalenediisocyanate, dimethyltriphenylmethanetetraisocyanate, triphenylmethanetriisocyanate, tris(isocyanatephenyl) thiophosphate, or combinations thereof. Commercially available isocyanates can include Rhodocoat® WT 2102 (Rhodia AG, France), Basonat™ LR 8878 (BASF Corp., North America), Desmodur® DA, and Bayhydur® 3100 (both Bayer AG, Germany). In some examples, the isocyanate can be protected from water. Exemplary polyols that can be used to create the polyurethane polymer can include 1,4-butanediol; 1,3-propanediol; 1,2-ethanediol; 1,2-propanediol; 1,6-hexanediol; 2-methyl-1,3-propanediol; 2,2-dimethyl-1,3-propanediol; neopentyl glycol; cyclohexanedimethanol; 1,2,3-propanetriol; 2-ethyl-2-hydroxymethyl-1,3-propanediol; or combinations thereof. In some examples, the isocyanate and the polyol can have less than three functional end groups per molecule or can have less than five functional end groups per molecule. In yet another example, the polyurethane can be formed from a polyisocyanate having at least two isocyanate functionalities and a polyol having at least two hydroxyl or amine groups. Exemplary polyisocyanates can include diisocyanate monomers and oligomers. The weight average molecular weight of the polyurethane prepolymer can range from 20,000 Mw to 200,000 Mw as measured by gel permeation chromatography. In another example, the weight average molecular weight of the polyurethane prepolymer can range from 40,000 Mw to 180,000 Mw, or from 60,000 Mw to 140,000 Mw as measured by gel permeation chromatography. Exemplary commercially available polyurethane polymers can include polyester based polyurethanes, U910, U938, U2101, and U420; polyether based polyurethane, U205, U410, U500, and U400N; polycarbonate based polyurethanes, U930, U933, U915, and U911; castor oil based polyurethane, CUR21, CUR69, CUR99 and CUR991; or combinations thereof (all available from Alberdingk Boley® Inc., North Carolina).

In some examples, the polyurethane can be aliphatic or aromatic. In one example, the polyurethane can include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, or a combination thereof. In another example, the polyurethane can include an aromatic polyether polyurethane, an aliphatic polyether polyurethane, an aromatic polyester polyurethane, an aliphatic polyester polyurethane, or a combination thereof. Exemplary commercially available examples of these polyurethanes can include NeoPac™ R-9000, R-9699, and R-9030 (Zeneca Resins, Massachusetts), Printrite® DP376 (Lubrizol Advanced Materials, Inc., Delaware), Sancure® AU4010 (Lubrizol Advanced Materials, Inc., Delaware), Hybridur® 570 (Air Products and Chemicals Inc., Pennsylvania), Sancure® 2710, Avalure® UR445 (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure® 878, Sancure® 815, Sancure® 1301, Sancure® 2715, Sancure® 2026, Sancure® 2016, Sancure® 1818, Sancure® 853, Sancure® 830, Sancure® 825, Sancure® 776, Sancure® 850, Sancure® 12140, Sancure® 12619, Sancure® 835, Sancure® 843, Sancure® 898, Sancure® 899, Sancure® 1511, Sancure® 1514, Sancure® 1517, Sancure® 1591, Sancure® 2255, Sancure® 2260, Sancure® 2310, Sancure® 2725, Sancure® 4010, Sancure® 12471 (all commercially available from Lubrizol Advanced Materials, Inc., Delaware), or combinations thereof.

In some examples, the polyurethane can be cross-linked using a cross-linking agent. For example, the cross-linking agent can be a blocked polyisocyanate. In one example, the blocked polyisocyanate can be blocked using polyalkylene oxide units which can be removed by heating the blocked polyisocyanate to a temperature at or above the deblocking temperature of the blocked polyisocyanate in order to yield free isocyanate groups. An exemplary commercially available blocked polyisocyanate can include Bayhydur® VP LS 2306 (Bayer AG, Germany). In another example, the cross-linking can occur at trimethyloxysilane groups along the polyurethane chain. Hydrolysis can cause the trimethyloxysilane groups to crosslink and form a silesquioxane structure. In another example, the crosslinking can occur at acrylic functional groups along the polyurethane chain. Nucleophilic addition to an acrylate group by an acetoacetoxy functional group can allow for crosslinking on polyurethanes including acrylic functional groups. In other examples, the polyurethane polymer can be a self-crosslinked polyurethane. In one example, a self-crosslinked polyurethane can be formed by reacting an isocyanate with a polyol.

The imaging layer film-forming binder can typically be present in the imaging layer in an amount from 40 wt % to 80 wt % on a dry basis. In some specific examples, the imaging layer film-forming binder can be present in the imaging layer in an amount from 45 wt % to 75 wt %, or from 50 wt % to 70 wt % on a dry basis. Where the imaging layer film-forming binder includes a first crosslinked polymeric network and a second crosslinked polymeric network, the individual crosslinked polymeric networks can typically be present in an amount from 5 wt % to 30 wt % on a dry basis. In some specific examples, individual crosslinked polymeric networks can be present in an amount from 10 wt % to 25 wt % on a dry basis. Where the imaging layer film-forming binder includes a polyurethane polymer, the the polyurethane polymer can typically be present in an amount from 4 wt % to 20 wt % on a dry basis. In some specific examples, the polyurethane polymer can be present in an amount from 8 wt % to 15 wt % on a dry basis. Where the imaging layer film-forming binder includes a self-crosslinking aliphatic polyurethane-acrylic network, the self-crosslinking aliphatic polyurethane-acrylic network can typically be present in an amount from 5 wt % to 25 wt % on a dry basis. In some specific examples, the self-crosslinking aliphatic polyurethane-acrylic network can be present in an amount from 9 wt % to 17 wt % on a dry basis.

In some additional examples, the imaging layer can include an imaging layer pigment filler. The imaging layer pigment filler can be selected from both inorganic and organic particulates, either in solid powder form or in dispersed slurry form. Examples of such particulates include, but are not limited to, aluminum silicate, kaolin clay, calcium carbonate, silica, alumina, boehmite, mica, talc, the like, or a combination thereof. In some examples, the imaging layer pigment filler includes a clay or a clay mixture. In some examples, the imaging layer pigment filler includes calcium carbonate or a calcium carbonate mixture. In some examples, calcium carbonate can include ground calcium carbonate (GCC), precipitated calcium carbonate (PCC), modified GCC, modified PCC, the like, or a combination thereof. Moreover, other combinations of any of the inorganic pigments described may be used. Any suitable combination of imaging layer pigment fillers can be used. Non-limiting commercially available examples can include HYDROCARB® 60 and HYDROCARB® 90 (available from Omya, U.S.A). The imaging layer pigment filler can be present in the imaging layer in an amount of from 10 wt % to 40 wt % on a dry weight basis. In some additional examples, the imaging layer pigment filler can be present in the imaging layer in an amount from 15 wt % to 30 wt % on a dry weight basis.

In some examples, the imaging layer can include a variety of additional additives. Non-limiting examples can include a thickener (e.g. OPTIFLO® TVS VF (available from available from BYK, U.S.A, for example), a film forming agent, a wax (e.g. SLIP-AYD® SL300 (available from Elementis Specialties, U.S.A.), for example), a defoaming agent (e.g BYK® 024 (available from BYK, U.S.A.), for example), a wetting agent (e.g. DYNWET® 800 (available from BYK, U.S.A.), for example), a dispersing agent, the like, or a combination thereof. These additional additives can typically be individually present in the imaging layer in an amount from 0.1 wt % to 15 wt % on a dry weight basis.

The first barrier layer, the primer layer, and the imaging layer can generally have a combined thickness of from 10 μm to 70 μm. In some additional examples, the first barrier layer, the primer layer, and the imaging layer can have a combined thickness of from 20 μm to 60 μm.

A non-woven support layer can be positioned on the backside (i.e. side opposite the imaging side) of the woven fabric substrate. The non-woven support layer can be a non-woven fabric or a non-woven paper. Unlike woven fabric, non-woven fabric contains no interwoven strands, but they do have an organized internal structure. These fabrics can be made by placing fibers together, then using heat, chemicals, or pressure to combine them into a cohesive fabric-like material. When reinforced, non-woven material provides superior strength and stability. The non-woven fabric or paper can have basis weight from 30 gsm to 200 gsm. In other examples, the non-woven support layer can have a basis weight from 40 gsm to 190 gsm, from 50 gsm to 180 gsm, or from 70 gsm to 170 gsm.

As previously noted, an adhesive layer can be sandwiched between the woven fabric substrate and the non-woven support layer. In some particular examples, the adhesive layer can be in direct contact with the woven fabric substrate and the non-woven support layer. In other examples, a second barrier layer, as described above, can be positioned between the adhesive layer and the woven fabric substrate. Typically, the adhesive layer includes an adhesive material and an adhesive layer flame retardant.

In one example, the adhesive material is or can include an aqueous latex adhesive. It can be selected from a wide variety of resin latexes. For example, the resin latex may include, but is not limited to, resins formed by polymerization of hydrophobic addition monomers. Examples of hydrophobic addition monomers include, but are not limited to, C1-C12 alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl acrylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), and aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethyl acrylate, hydroxyethylmthacrylate), carboxylic containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomer, C1-C12 alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido)methylene), the like, or combinations thereof. In some examples, polymers made from the polymerization and/or copolymerization of alkyl acrylate, alkyl methacrylate, vinyl esters, and styrene derivatives can also be useful. Non-limiting examples of an aqueous latex adhesives can include HYCAR® acrylic resins, such as HYCAR® 26973, HYCAR® 26996, HYCAR® 26975, HYCAR® NH3069, and HYCAR® FF26921 (each available from Lubrizol, USA). The aqueous latex adhesive can typically be present in the adhesive layer in an amount from 40 wt % to 70 wt % on a dry basis. In some specific examples, the aqueous latex adhesive can be present in the adhesive layer in an amount from 45 wt % to 65 wt %, or from 50 wt % to 60 wt % on a dry basis.

In some additional examples, the adhesive material can include crosslinked polymer network, or a first crosslinked polymer network and a second crosslinked polymer network. Generally, the same crosslinked polymer network materials as disclosed with respect to the imaging layer can be used for the crosslinked polymer network material of the adhesive layer. Where present, the crosslinked polymer network can typically be present in the adhesive layer in an amount from 1 wt % to 20 wt % on a dry basis. In some specific examples, the crosslinked polymer network can be present in the adhesive layer in an amount from 5 wt % to 15 wt % on a dry basis. Where a first and second crosslinked polymer network are employed, individual crosslinked polymer networks can be present in the adhesive layer in an amount from 1 wt % to 10 wt %, or from 2 wt % to 8 wt % on a dry basis.

The adhesive layer flame retardant can include a variety of substances that reduces flammability or delays combustion of the fabric printing media. In some examples, compounds containing a halogen, antimony, or a combination thereof are excluded from the list of flame retardants as they are considered as non-environmentally friendly compounds. Examples of suitable flame retardants can include phosphorus-containing compounds, nitrogen-containing compounds, the like, or a combination thereof. Phosphorus-containing compounds including organic phosphates, inorganic phosphates, and/or phosphates with different oxidation states are effective for use. Nitrogen-containing compounds that can likewise be used include melamine (including melamine derivatives) such as melamine, melamine cyanurate, melamine polyphosphate, melem, melon, the like, or a combination thereof. Other suitable flame retardants as described herein can also be used in some examples. One non-limiting example of a commercially available flame retardant is SpaceRite® S-3 (available from J.M Huber Corporation). The adhesive layer flame retardant can typically be present in the adhesive layer in an amount from 20 wt % to 50 wt % on a dry basis. In some specific examples, the adhesive layer flame retardant can be present in the adhesive layer in an amount from 30 wt % to 40 wt %.

In some specific examples, the adhesive layer flame retardant can have a water solubility at ambient conditions of from 0 g/100 g $H_2O$ to 0.5 g/100 g $H_2O$. In some additional examples, the adhesive layer flame retardant can have a water solubility at ambient conditions of from 0 g/100 g $H_2O$ to 0.15 g/100 g $H_2O$. In some examples, flame retardants with higher water solubilities can migrate onto the surface of the primer layer or the imaging layer and decrease ink adhesion and image durability.

The adhesive material of the adhesive layer can form a thin and continuous layer together with the adhesive layer flame retardant to increase hydrophobicity and flame resistance of the fabric print medium. The weight ratio of the adhesive material to flame retardant is typically from 1:1 to 4:1.

Figure 3:
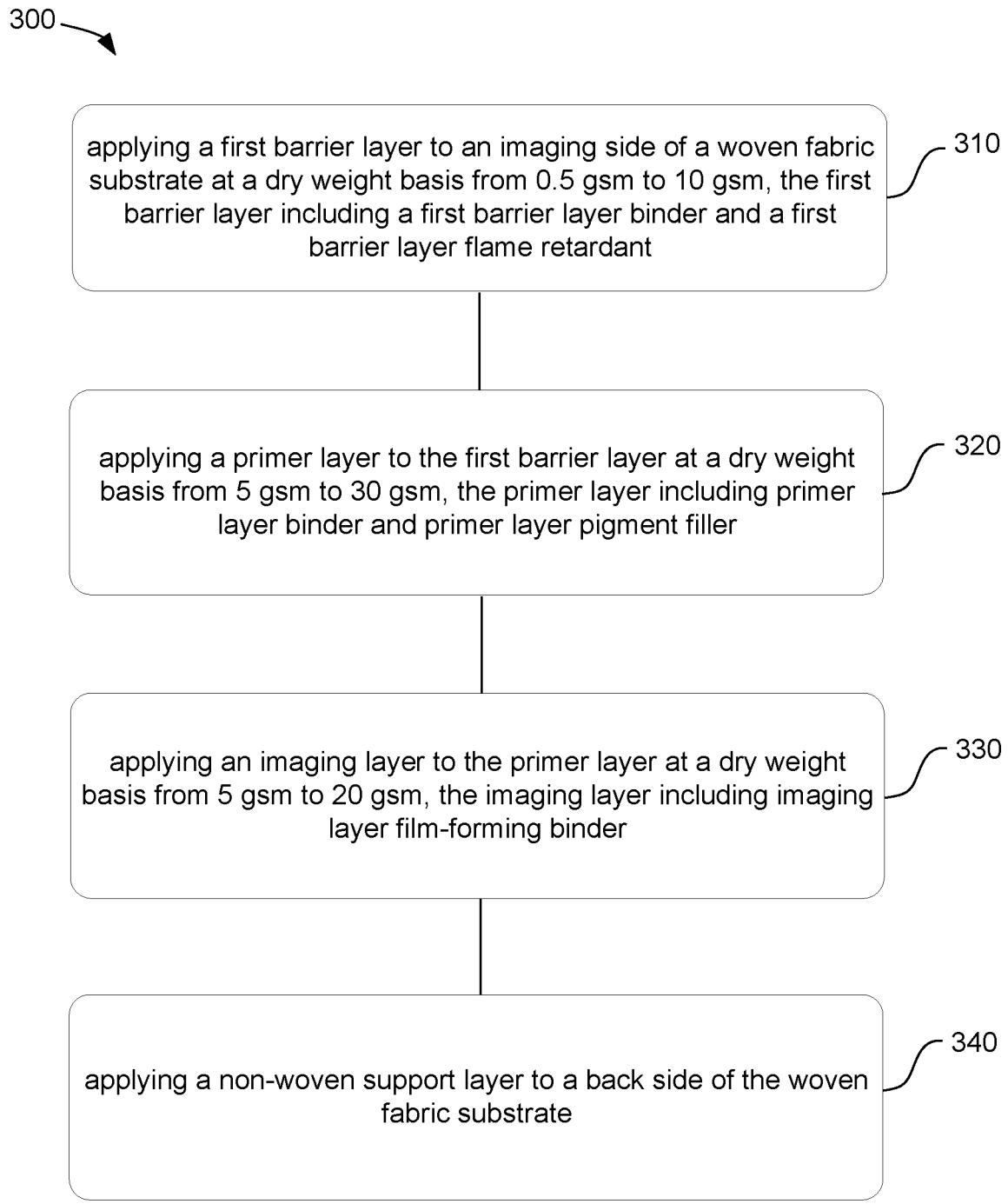
FIG. 3 is a flow diagram of an example method of manufacturing a fabric print medium in accordance with the present disclosure.

The present disclosure also describes methods of manufacturing a fabric print medium. One non-limiting example of a method of manufacturing a fabric print medium 300 is depicted in FIG. 3. This particular example can include applying 310 a first barrier layer to an imaging side of a woven fabric substrate at a dry weight basis from 0.5 gsm to 10 gsm, the first barrier layer including a first barrier layer binder and a first barrier layer flame retardant. The method can also include applying 320 a primer layer to the first barrier layer at a dry weight basis from 5 gsm to 30 gsm, the primer layer including primer layer binder and primer layer pigment filler. The method can also include applying 330 an imaging layer to the primer layer at a dry weight basis from 5 gsm to 20 gsm, the imaging layer including imaging layer film-forming binder. The method can additionally include applying 340 a non-woven support layer to a back side of the woven fabric substrate.

In further detail, the methods can include applying a first barrier layer to an imaging side of a woven fabric substrate at a dry weight basis from 0.5 gsm to 10 gsm. In another example, the first barrier layer can be applied to the imaging side of the woven fabric substrate at a dry weight basis from 2 gsm to 6 gsm. In some specific examples, the first barrier layer can be applied using a blade coater, a rod coater, or a knife coater. The woven fabric substrate and the first barrier layer can have the components and parameters described previously. In some examples, the methods of manufacturing a fabric print medium can include treating the woven fabric substrate with a flame retardant to prepare a treated woven fabric substrate, as described previously. Where this is the case, the treatment of the fabric print medium can be performed prior to applying the first barrier layer to the imaging side of the woven fabric substrate.

The methods of manufacturing a fabric print medium can also include applying a primer layer to the first barrier layer at a dry weight basis from 5 gsm to 30 gsm. In another example, the primer layer can be applied to the first barrier layer at a dry weight basis from 10 gsm to 30 gsm. In some specific examples, the primer layer can be applied using a blade coater, a rod coater, or a knife coater. The primer layer can include the same components and parameters as described previously.

The methods of manufacturing a fabric print medium can also include applying an imaging layer to the primer layer at a dry weight basis from 5 gsm to 20 gsm. In some additional examples, the imaging layer can be applied to the primer layer at a dry weight basis from 10 gsm to 20 gsm. In some examples, the imaging layer can be coated in a single pass. In some other examples, the imaging layer can be applied in a plurality of passes (e.g. 2 passes, 3 passes, etc.). The imaging layer can include the same components and parameters as described previously.

A non-woven support layer can be "on" the backside of the woven fabric substrate. By "on," it is meant that the non-woven support layer is applied in direct or indirect contact with the woven fabric substrate, e.g., with or without an intervening layer(s). For example, in some cases, a second barrier layer can be applied between the woven fabric substrate and the non-woven support layer. Where this is the case, the second barrier layer can be applied at a dry weight basis of from 0.5 gsm to 10 gsm, or from 2 gsm to 6 gsm. In some specific examples, the second barrier layer can be applied using a blade coater, a rod coater, or a knife coater. The second barrier layer can include the same components and parameters as described above with respect to the first barrier layer.

In some additional examples, an adhesive layer can be applied between the woven fabric substrate and the non-woven support layer. In some specific examples, the adhesive layer can be applied between the second barrier layer and the non-woven support layer. The adhesive layer can typically be applied at a dry weight of from 3 gsm to 30 gsm. In other examples, the adhesive layer can be applied at a dry weight of from 10 gsm to 20 gsm. The adhesive layer can include the same components and parameters as described previously.

The present disclosure also describes printing methods. One non-limiting example of a printing method 400 is presented in FIG. 4. The method can include applying 410 an ink composition to a fabric print medium to generate a printed image thereon. Generally, the printing methods can include applying an ink composition to a fabric print medium as described herein to generate a printed image thereon. In some specific examples, the printing methods can further include curing the fabric print medium with the ink composition applied thereto at a temperature of from 75° C. and 150° C. to cause the imaging layer film-forming binder to form a film, as described previously. In some further examples, the printed image can be generated with latex-based inks with pigment colorant.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those in the field technology determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following are only exemplary or illustrative of the application of the principles of the presented fabric print media and associated methods. Numerous modifications and alternatives may be devised without departing from the present disclosure. The appended claims are intended to cover such modifications and arrangements. Thus, while the disclosure has been provided with particularity, the following describes further detail in connection with what are presently deemed to be the acceptable examples.

Example 1—Preparation of Coating Formulations and Fabric Print Media Construction Fabric print media were prepared using a 100% woven polyester fabric having a weight of 200 gsm. Before applying any coating compositions layers to the substrate, the woven fabric substrates were treated with a flame retardant treatment formulation, as set forth in the Table 1. In this example, the flame retardant treatment composition is applied as a fabric treatment rather than a coating layer, as it treats the fabric throughout the bulk of the material and thus, is not in the form of a layer per se.

TABLE 1

| Flame Retardant Treatment Formulation | | |
|---|---|---|
| Component | Type | Dry Parts by Weight |
| AFLAMMIT ® MSG | Flame Retardant | 0.5 |
| Water | Solvent | Balance |

AFLAMMIT ® is available from Thor Specialties, Inc (Connecticut, USA).

The woven fabric was treated with the flame-retardant treatment formulation and then allowed to dry by in a multi-zone dryer at a temperature up to 170° C. The treated fabric was then coated with first and second barrier layers on both the imaging layer side and the backside of the woven fabric substrate, respectively, using a knife coater. The first and second barrier layers had equivalent formulations as shown in Table 2, which shows only the component parts by weight in the dried layers, but would be formulated for application in a carrier solvent, such as water, and then dried by in a multi-zone hot dryer at a temperature up to 140° C. to leave the respective barrier layers. The coating weight for first and second barrier layers can independently have a dry coating weight from 1 gsm to 10 gsm, for example, but in this example, both sides were coated at 6 gsm.

TABLE 2

First and Second Barrier Layer Formulations

| Ingredient | Type | Dry Parts by Weight |
|---|---|---|
| EDOLAN ® AB | Polymeric Binder | 40 |
| SPACERITE ® S3 | Flame Retardant | 100 |
| TEGO ® WET 510 | Surfactant | 1 |
| FOAMASTER ® MO 2185 | Defoaming Agent | 0.5 |

EDOLAN ® is available from Tanatex chemicals, Netherlands;
SPACERITE ® is available from Huber Specialty Hydrates, LLC, USA;
TEGO ® WET is available from Evonik Industries, Germany; and
FOAMASTER ® is available from BASF, U.S.A.

A primer layer was then applied on the first barrier layer on the imaging side of the woven fabric substrate using a knife coater. The formulation of the dry primer layer is provided in Table 3, but would be formulated for application in a carrier solvent, such as water, and then dried in a multi-zone hot dryer at a temperature up to 140° C. to leave the primer layer behind. The primer layer can be applied at a dry coating weight of from 5 gsm to 30 gsm, but in this example was applied at 15 gsm.

TABLE 3

Primer Layer Formulation

| Ingredient | Type | Dry Parts by Weight |
|---|---|---|
| HYDROCARB ® 60 | Calcium carbonate pigment filler | 80 |
| HYDROCARB ® 90 | Calcium carbonate pigment filler | 20 |
| ACRONAL ® 866 | Styrene-acrylic binder | 15 |
| 2-Pyrrolidinone | Film-forming agent | 1 |
| DYNWET ® 800 | Silicone-free wetting agent | 0.5 |
| BYK ® 024 | VOC-free silicone defoamer | 0.2 |
| STEROCOLL ® FS nm | Thickener | 1 |

HYDROCARB ® is available from Omya, USA;
ACRONAL ® is available from BASF, USA;
DYNWET ® and BYK ® are available from BYK, USA; and
STEROCOLL ® is available from BASF, U.S.A.

On top of the primer layer, an imaging layer was applied by a knife coater. The formulation of the imaging layer is provided in Table 4, but would be formulated for application in a carrier solvent, such as water, and then dried by a multi-zone hot dryer with temperature up to 175° C. to leave the primer layer behind. The imaging layer can be applied at a dry coating weight of from 5 gsm to 20 gsm, but in this example was applied at 12 gsm.

TABLE 4

Imaging Layer Formulation

| Ingredient | Type | Dry Parts by Weight |
|---|---|---|
| Dynwet ® 800 | Silicone-free wetting agent | 1 |
| BYK ® 024 | VOC-free silicone defoamer | 0.5 |
| ARALDITE ® PZ 3901 | Crosslinked polymer network | 8 |
| ARADUR ® 3985 | Crosslinked polymer network | 8 |
| SANCURE ® 2016 | Polyurethane | 5 |
| SANCURE ® 4010 | Self-crosslinking aliphatic polyurethane-acrylic network | 6 |
| SLIP-AYD ® SL 300 | Polyethylene wax | 5 |
| HYDROCARB ® H60 | Calcium carbonate pigment filler | 10 |
| 2-Pyrrolidinone | Film forming agent | 0.8 |
| OPTIFLO ® TVS VF | Thickener | 0.5 |

ARALDITE ® is available from Huntsman Advanced Materials Americas, USA;
ARADUR ® is available from Huntsman Advanced Materials Americas, USA;
SANCURE ® is available from Lubrizol, USA;
SLIP-AYD ® is available from Elementis Specialties, USA; and
OPTIFLO ® TVS VF is available from BYK, U.S.A.

The first barrier layer, the primer layer, and the imaging layer can have a combined thickness from 10 μm to 70 μm, but in this example can range from 30 μm to 60 μm. After the imaging layer was applied to the primer layer, the coated woven fabric substrate was laminated with a 160 gsm non-woven paper using a lab laminator with an adhesive layer having a formulation listed in Table 5 and being applied to the non-woven paper using a rod coater with water as the solvent. After lamination the composite fabric print media were calendared using a lab soft-calendar at 1000 psi and 90° C.

TABLE 5

Adhesive Layer Formulation

| Ingredient | Type | Amount (Dry Parts) |
|---|---|---|
| HYCAR ® 26871 | Latex | 55 |
| SPACERITE ® S-3 | Flame Retardant | 35 |
| ARALDITE ® PZ 3901 | Crosslinked polymer network | 5 |
| ARADUR ® 3985 | Crosslinked polymer network | 5 |

HYCAR ® is available from Lubrizol, U.S.A.

Example 2—Printed Image Quality on Fabric Print Media

The fabric print medium prepared in accordance with Example 1 was printed using an HP latex L360 printer. The image quality, as measured by parameters such as gamut (L*min), Type II scrubbability, and Type II stain resistance per ASTM F793 "Standard Classification of Wall Covering" was determined.

More specifically, scrubbability was performed by exposing the image side of the printed fabric print medium to a nylon bristle brush and detergent solution prepared in accordance with Section 7.4.1 of ASTM F793. Specifically, the nylon bristle brush and detergent solution were moved in a linear back-and-forth motion attempting to wear down the image side of the printed fabric print medium. If after 300 cycles there is no evidence of appreciable change to the printed fabric print medium, the printed fabric print medium passes the scrubbability test.

The stain resistance test was also performed in accordance with ASTM F793. Specifically, 12 reagents were placed on the image side of the fabric print medium and covered with a watch glass. After 24 hours the watch glass was removed and each stain was visually scored on a scale from 1-5 as defined per ASTM F793 with levels 1-3.5 receiving a "failure" score and levels 4-5 receiving a "pass" score. The Gamut (72 Color) test was performed via a digital measuring method and visual evaluation of image quality to measure digital color gamut.

Results of the image quality evaluation is provided in Table 6.

TABLE 6

Results of Image Quality Testing

| Type II Scrub, 300 Cycles | Type II Stain, 12 Reagents | Gamut (72 Color) |
|---|---|---|
| Pass | Pass all 12 reagents | 208K, K L * min < 25 |

Two comparative wall covering print media were also tested for scrubbability. Sample 1 was a generic commercial wall paper with unknown coating composition or coating thickness. Sample 2 was a woven fabric print medium having a base coat and a top coat on the image side. In further detail, a base coat of $CaCO_3$ and styrene-butadiene (SBR) resin was applied to the woven fabric substrate at a coating weight of 20 gsm. A top coat of $CaCO_3$ and acrylic resin were applied to the base coat at a coating weight of 10 gsm. A printed image was applied to each of these wall covering print media using an HP latex L360 printer. Scrubbability was performed as described above. The approximate number of scrubs at failure are reported in Table 7.

TABLE 7

Results of Scrubbability of Comparative Samples

| Comparative Print Media | Number of Scrubs at Failure |
|---|---|
| Sample 1 | 80-100 |
| Sample 2 | 100-110 |

As can be seen in Table 7, both Sample 1 and Sample 2 failed the scrubbability test well before 300 scrub cycles. Additional Type II Stain testing and Gamut testing were not performed on these print media due to early failure of the scrubbability test.

While the present technology has been described with reference to certain examples, various modifications, changes, omissions, and substitutions can be made without departing from the spirit of the disclosure. It is intended, therefore, that the disclosure be limited only by the scope of the following claims.

What is claimed is:

1. A fabric print medium, comprising:
a woven fabric substrate;
a first barrier layer on an imaging side of the woven fabric substrate, the first barrier layer comprising first barrier layer binder and first barrier layer flame retardant;
a primer layer on the first barrier layer, the primer layer including primer layer binder and primer layer pigment filler;
an imaging layer on the primer layer, the imaging layer including imaging layer film-forming binder, wherein the first barrier layer, the primer layer, and the imaging layer have a combined thickness from 10 μm to 70 μm; and
a non-woven support layer on a back side of the woven fabric substrate.

2. The fabric print medium of claim 1, wherein the woven fabric substrate has a weight basis from 50 gsm to 400 gsm.

3. The fabric print medium of claim 1, wherein the first barrier binder comprises a blend of an adhesion promotion polymer binder and a physical networking polymer.

4. The fabric print medium of claim 1, wherein the imaging film-forming polymer comprises a network of multiple polymers including both crosslinked and crosslinkable polymeric binders.

5. The fabric print medium of claim 1, wherein the imaging layer further comprises an imaging layer pigment filler.

6. The fabric print medium of claim 1, further comprising an adhesive layer between the woven fabric substrate and the non-woven support layer, the adhesive layer including an adhesive layer flame retardant.

7. The fabric print medium of claim 6, further comprising a second barrier layer positioned between the woven fabric substrate and the adhesive layer, the second barrier layer comprising a second barrier layer binder and a second barrier layer flame retardant.

8. The fabric print medium of claim 1, wherein the non-woven support layer has a weight basis from 30 gsm to 200 gsm.

9. A method of manufacturing a fabric print medium, comprising:
applying a first barrier layer to an imaging side of a woven fabric substrate at a dry weight basis from 0.5 gsm to 10 gsm, the first barrier layer comprising a first barrier layer binder and a first barrier layer flame retardant;
applying a primer layer to the first barrier layer at a dry weight basis from 5 gsm to 30 gsm, the primer layer including primer layer binder and primer layer pigment filler;
applying an imaging layer to the primer layer at a dry weight basis from 5 gsm to 20 gsm, the imaging layer including imaging layer film-forming binder; and
applying a non-woven support layer to a back side of the woven fabric substrate.

10. The method of claim 9, further comprising treating the woven fabric substrate with a flame retardant.

11. The method of claim 9, further comprising applying a second barrier layer between the woven fabric substrate and the non-woven support layer at a dry weight basis from 0.5 gsm to 10 gsm, the second barrier layer comprising a second barrier layer binder and a second barrier layer filler.

12. The method of claim 11, further comprising applying an adhesive layer between the second barrier layer and the non-woven support layer at a dry weight basis from 3 gsm to 30 gsm, the adhesive layer comprising an adhesive layer flame retardant.

13. A printing method, comprising applying an ink composition to a fabric print medium to generate a printed image thereon; the fabric print medium, comprising:
a woven fabric substrate;
a first barrier layer on an imaging side of the woven fabric substrate, the first barrier layer comprising first barrier layer binder and first barrier layer flame retardant;
a primer layer on the first barrier layer, the primer layer including primer layer binder and primer layer pigment filler;
an imaging layer on the primer layer, the imaging layer including imaging layer film-forming binder, wherein the first barrier layer, the primer layer, and the imaging layer have a combined thickness from 10 μm to 70 μm; and a non-woven support layer on a back side of the woven fabric substrate.

14. The method of claim 13, further comprising curing the fabric print medium with the ink composition applied thereto at a temperature of from 75° C. and 150° C. to cause the imaging layer film-forming binder to form a film.

15. The method of claim 13, wherein the ink composition is a latex-based ink composition with pigment colorant.

* * * * *